April 1, 1941.　　　　A. LESAGE　　　　2,236,508

SPREADABLE BRAKE BODY PARTICULARLY ADAPTED FOR BICYCLE HUBS

Filed June 26, 1939

Inventor

Alfred Lesage by

Dean Fairbank & Hirsch

Attys

Patented Apr. 1, 1941

2,236,508

UNITED STATES PATENT OFFICE 2,236,508

SPREADABLE BRAKE BODY PARTICULARLY ADAPTED FOR BICYCLE HUBS

Alfred Lesage, Schweinfurt, Germany

Application June 26, 1939, Serial No. 281,190
In Germany July 5, 1938

4 Claims. (Cl. 188—251)

The present invention relates to a spreadable brake body particularly adapted for free wheel hubs of bicycles provided with back pedalling brake in which a lining of resilient brake material is mounted upon a base member consisting for instance of steel.

The invention essentially consists in this that the brake lining in the form of shallow dishlike members and comprising a mixture of hard particles and a binding medium which after solidification is somewhat resilient, is fixed in continuous longitudinal notches distributed upon the circumference of the spreadable brake body and projects to a certain degree beyond the rib- or ledge-like parts of the spreadable body bordering the notches.

The resilient friction members are prevented from shifting in the longitudinal direction and in the direction of the circumference by undercutting the ledge-like intermediate members and by rivets or the like respectively.

The degree of compression of the resilient friction members is limited by the rib- or ledge-like members of the spreadable body so that on the one hand the resilient friction members cannot be forced out of their seat and on the other hand the carrier or base member respectively cannot be unduly spread. In this manner the form and elasticity of the friction members may be maintained for a long period of time.

The dish-like friction members after having been finished by pressing may be inserted between the ribs of the base member or carrier. The still plastic material may, however, also be pressed into the notches before solidification of the material takes place. The rivets or other holding members simultaneously prevent displacement of the friction members in the notches, if for the purpose of spreading to effect braking the sleeve-like base member is displaced along the inner surface of the hub by means of cones of the hub. On the other hand worn out friction members may quickly be replaced, because after loosening they may be pushed through the notches both ends of which are open.

In the accompanying drawing one embodiment of a brake according to the invention is shown by way of example.

Figure 4:
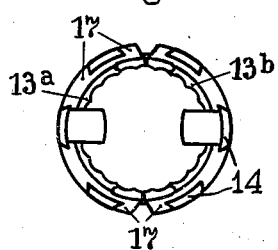
Fig. 4 is an end view of the brake sleeve.
Figure 5:
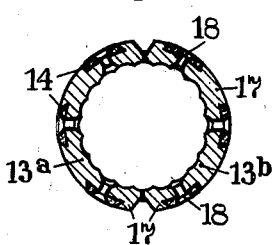
Fig. 5 is a cross section on the line V—V of Fig. 2.
Figure 6:
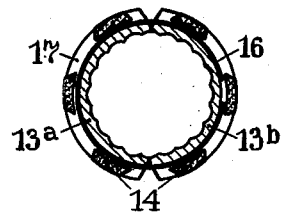
Fig. 6 is a cross section on the line VI—VI of Fig. 2.
Figure 8:
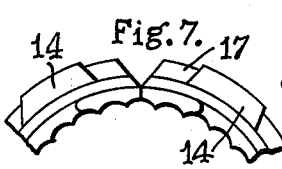
Figure 7:
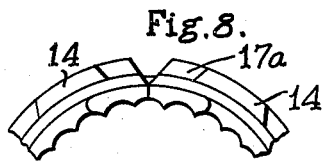

Fig. 7 is an enlargement of a portion of Fig. 4, and shows the brake body in inoperative braking position, and Fig. 8 is a fragmentary end view of another form of brake sleeve embodying the present invention, and showing said brake sleeve in braking position with the brake linings compressed, so that the outer peripheries thereof are continuous with the outer peripheries of the ribs confining the sides of said brake linings.

Figure 3:
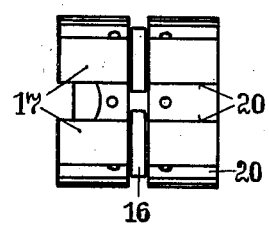
Fig. 3 shows a similar side view of the brake body without the brake lining.

The preferably two-part brake sleeve consists of the semi-cylindrical parts 13a and 13b the ends of which are in the form of hollow cones and which are held together by an annular spring 16 mounted in an annular notch. The brake sleeve could also be made of various members or consist of a single piece having a slot in its longitudinal direction. Provided in the circumferential outer surface of the halves 13a and 13b are undercut longitudinal notches 20 (Fig. 3) between which longitudinal ribs 17 are formed the edges of which engage dish-like lining members 14 arranged in the notches. These brake lining members preferably are fixed upon the brake body against displacement out of their position by rivets 18, for instance hollow rivets.

The brake lining members 14 consist of a suitable artificial material which may be pressed into the desired shape and of hard particles eventually in combination with a filling material, such as asbestos fibres. For instance the brake lining members may consist of a mixture of aluminium granules and synthetic rubber. Of course, other binding materials may be used instead of the metal chips serving as filling material. The brake lining extends to a slight degree beyond the outer surface of the longitudinal ribs. As due to its elasticity the entire circumference of the brake lining may bear against the inner surface of the hub sleeve, a brake surface of two different properties or natures may come to action. The special arrangement has the advantage that the sharp longitudinal edges of the ledge-shaped ribs 17 extending beyond the brake lining do not only lift the brake lining from the hub sleeve, but also scrape off and return into the notches particles of the brake lining which may stick at the sleeve of the hub.

Depending on the use of the brake, the longitudinal ribs may have larger or smaller width. They also need not be worked out of the material of the base body, but may be made of individual ledge members 17a fixed upon the brake body by point welding or in another suitable manner as shown in Fig. 8.

Figure 1:
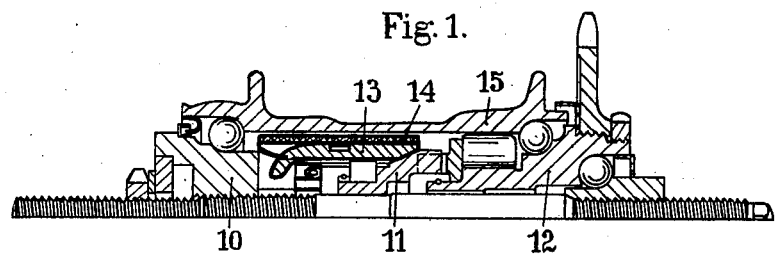
Fig. 1 is a longitudinal section through one half of a free wheel brake hub.
Figure 2:
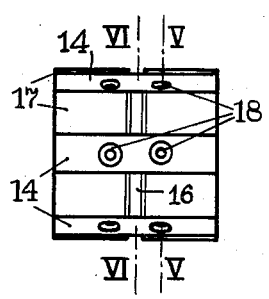
Fig. 2 shows in side view the circumference of the brake body.

As shown in Fig. 1, the spreadable brake sleeve 13a, 13b is arranged in the free wheel brake hub between spreading cones 10 and 11 mounted in opposition to each other. The spreadable brake sleeve is carried by the spreading cones 10 and 11. During braking the displaceable spreading cone 11 is pressed against the spreading cone 10 which is fixed in position by screws, so that both jaws 13a, 13b are spread against the hub sleeve 15.

I claim:

1. A spreadable brake body particularly adapted for free wheel hubs of bicycles and provided with a resilient brake lining, said brake lining comprising a mixture of hard particles and a binding medium which after solidification is resilient, and being shaped into flat dish-like members arranged in continuous longitudinal notches distributed in a large number upon the circumference of the said spreadable body, said brake lining slightly projecting beyond ledge-shaped parts of said spreadable body bordering said notches, when said brake body is in inoperative brake position and said members are at normal temperature.

2. A spreadable brake body as set forth in claim 1 in which said flat dish-like brake lining members are held in position upon said spreadable body against circumferential and longitudinal displacement by undercuttings of said ledge-shaped members and by holding members respectively passing through said brake lining members and secured to the parts of said brake body forming the base walls of said notches.

3. A spreadable brake body particularly adapted for free wheel hubs of bicycles and provided with a resilient brake lining, said brake lining comprising a mixture of hard particles and a binding medium which after solidification is resilient, and being shaped into flat dish-like members fixed in continuous longitudinal notches distributed in a large number upon the circumference of said spreadable body, said brake lining projecting slightly beyond said ledge-shaped members of said spreadable body bordering the notches when said brake body is in inoperative brake position and said members are at normal temperature, said ledge-shaped members being fixed upon the spreadable body the outer circumference of which has the shape of a cylinder.

4. In a bicycle of the type having a free wheel hub sleeve, a brake for said sleeve in the interior thereof, and comprising a substantially cylindrical sleeve, expansible radially outwardly towards the inner periphery of said hub sleeve, and having a plurality of circumferentially spaced dovetail grooves on its outer surface extending lengthwise thereof and open at both ends, brake lining members having dovetail cross-sections corresponding substantially to that of said grooves and extending snugly in said grooves respectively, said brake lining members having outer circular surfaces concentric with the axis of said brake sleeve, and extending a short distance radially outwardly beyond the outer circular surfaces of the brake sleeve between said brake lining members when said brake is not applied and said brake lining members are at normal temperature, said brake lining members comprising a mixture of hard particles and a binding resilient medium, and fastening members for said lining members passing substantially radially through said members and affixed to the portions of the brake sleeve forming the base walls of said grooves.

ALFRED LESAGE.